(12) United States Patent
Chew et al.

(10) Patent No.: US 12,077,325 B2
(45) Date of Patent: Sep. 3, 2024

(54) AIRCRAFT

(71) Applicant: Dr. Ing. h.c. F. Porsche Aktiengesellschaft, Stuttgart (DE)

(72) Inventors: Guan Chew, Bietigheim-Bissingen (DE); Michael Fürstner, Gerlingen (DE); Stefan Bender, Löchgau (DE); Mikel Fauri, Ludwigsburg (DE); Malte Rotermund, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 43 days.

(21) Appl. No.: 17/920,434

(22) PCT Filed: Apr. 21, 2021

(86) PCT No.: PCT/EP2021/025146
§ 371 (c)(1),
(2) Date: Oct. 21, 2022

(87) PCT Pub. No.: WO2021/233572
PCT Pub. Date: Nov. 25, 2021

(65) Prior Publication Data
US 2023/0174253 A1    Jun. 8, 2023

(30) Foreign Application Priority Data
May 19, 2020    (DE) .................... 10 2020 113 489.4

(51) Int. Cl.
*B64U 50/14*    (2023.01)
*B64U 10/20*    (2023.01)
*B64U 30/26*    (2023.01)

(52) U.S. Cl.
CPC ............ *B64U 50/14* (2023.01); *B64U 10/20* (2023.01); *B64U 30/26* (2023.01)

(58) Field of Classification Search
CPC ................................ B64U 50/14; B64U 30/24
See application file for complete search history.

(56) References Cited

U.S. PATENT DOCUMENTS 3,179,353 A      4/1965  Peterson
3,335,960 A  *   8/1967  Alderson ............ B64C 29/0091
                                                            60/230
(Continued)

FOREIGN PATENT DOCUMENTS

DE    102009048201 A1    4/2011
GB         2146298 A     4/1985
(Continued)

OTHER PUBLICATIONS

International Search Report and Written Opinion for International Application No. PCT/EP2021/025146, dated Jul. 30, 2021, 12 pages.
(Continued)

*Primary Examiner* — Christopher P Ellis
(74) *Attorney, Agent, or Firm* — Buchanan Ingersoll & Rooney PC

(57) ABSTRACT

An aircraft includes a wing having an integrated ducted fan. The ducted fan is optionally equipped with inlet louvers and outlet louvers. The inlet louvers and the outlet louvers are adjustable between an open position and a closed position.

19 Claims, 11 Drawing Sheets

(56) References Cited

U.S. PATENT DOCUMENTS

| | | | | |
|---|---|---|---|---|
| 3,700,189 | A | | 10/1972 | Timperman |
| 3,912,201 | A | * | 10/1975 | Bradbury ............ B64C 29/0016 60/230 |
| 4,469,294 | A | * | 9/1984 | Clifton .................... B64C 39/12 244/12.3 |
| 4,674,709 | A | * | 6/1987 | Welles .................... B64C 39/10 244/45 R |
| 4,828,203 | A | * | 5/1989 | Clifton ................ B64C 29/0033 244/12.3 |
| 5,769,317 | A | * | 6/1998 | Sokhey .................... F02K 3/025 239/265.23 |
| 6,561,456 | B1 | * | 5/2003 | Devine .............. B64C 29/0025 244/12.3 |
| 8,496,200 | B2 | * | 7/2013 | Yoeli .................. B64C 29/0025 244/23 B |
| 10,040,547 | B1 | | 8/2018 | Pedigo |
| 10,246,184 | B2 | | 4/2019 | Ragland |
| 11,203,412 | B2 | * | 12/2021 | Lee ......................... B64C 11/46 |
| 11,661,179 | B2 | * | 5/2023 | Matsui .................... B64D 27/24 244/7 R |
| 11,873,084 | B2 | * | 1/2024 | Chew ...................... B64C 39/10 |
| 2009/0084907 | A1 | * | 4/2009 | Yoeli ........................ B64C 27/20 415/149.1 |
| 2016/0368600 | A1 | * | 12/2016 | Frolov ................. G08G 5/0065 |
| 2017/0158322 | A1 | * | 6/2017 | Ragland .............. B64C 29/0025 |
| 2019/0375492 | A1 | | 12/2019 | Lee |
| 2020/0010185 | A1 | | 1/2020 | Bender |
| 2020/0354052 | A1 | | 11/2020 | Chew et al. |
| 2021/0300540 | A1 | | 9/2021 | Robertson et al. |
| 2021/0362836 | A1 | | 11/2021 | Parks |

FOREIGN PATENT DOCUMENTS

| | | | | |
|---|---|---|---|---|
| GB | 2567199 | A | * | 4/2019 ........... B64C 11/001 |
| KR | 20180069594 | A | | 6/2018 |
| KR | 20190047446 | A | | 5/2019 |
| WO | 2016066848 | A1 | | 5/2016 |

OTHER PUBLICATIONS

Notice of Allowance for U.S. Appl. No. 17/920,875 mailed Apr. 23, 2024 (9 pages).

Non Final Office Action for U.S. Appl. No. 17/920,875 mailed Dec. 27, 2023, 15 pages.

Office Action (Communication pursuant to Article 94(3) (EPC) issued May 22, 2024, by the European Patent Office in corresponding European Patent Application No. 21 721 832.0, with English machine translation. (10 pages).

* cited by examiner

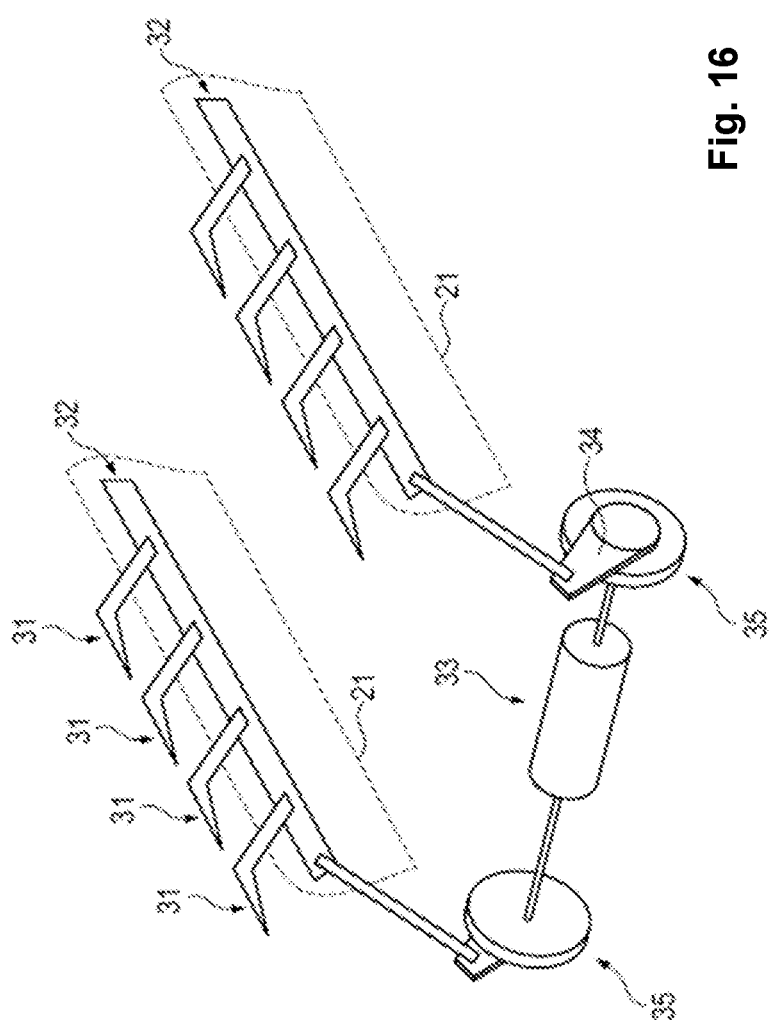

AIRCRAFT

The present invention relates to an aircraft, in particular an all-electric, vertical take-off and landing (VTOL) aircraft.

PRIOR ART

In aerospace technology, the term VTOL refers to any type of aircraft, drone, or rocket that has the ability to take off and land substantially vertically and without the need for a take-off and landing runway. This collective term is subsequently used in a broad sense, which includes not only fixed-wing aircraft having wings, but also rotorcraft such as helicopters, gyrocopters, gyrodynes, and hybrids such as combined helicopters or combined gyros as well as convertiplanes. Furthermore, aircraft capable of short take-off and landing (STOL), short take-off and vertical landing (STOVL), or vertical take-off and horizontal landing (VTHL) are included here.

DE 10 2009 048 201 A1 discloses a vertical take-off and landing-capable aircraft comprising a vertically oriented ducted fan having thrust vector blades on the outlet side and integrated in the fuselage. The outlet opening of the lift fan, in turn, has pivotable louvers aligned transversely to the longitudinal axis of the aircraft in order to influence the direction of the exiting exhaust jet. This thrust vector control allows movements to be controlled around the pitch axis.

WO 2016/066848 A1 relates to a flying car having two stationary impellers and shutter louvers that are rolled together between the impeller shafts during flight. The propulsion force is achieved by the displacement of the louvers.

GB 2 146 298 B describes a nozzle channel, the walls of which are made of hinged louvers, which are moved with cable pulls while being guided in guides in order to be able to take different positions along the guides.

DISCLOSURE OF THE INVENTION

The invention provides an aircraft, in particular an all-electric aircraft in the above sense, capable of vertical take-off and landing according to the independent claim 1.

The inventive approach is based on the insight that a VTOL aircraft intended for lifting and cruising flight requires propulsion units that are able to handle every flight phase (take-off, transition, cruising, and landing).

To propel the aircraft, therefore, instead of a free-traveling rotor, a ducted fan integrated in the wing is provided, as is known outside of aerospace technology, for example, from air cushion vehicles or airboats. The cylindrical housing surrounding the fan can significantly reduce the thrust losses as a result of turbulence at the blade tips.

One variant of the invention is further based on the finding that a ducted fan for lifting-capable and cruising-capable VTOL aircraft should not only be closed but aerodynamically sealed during cruising conditions. In light of this, one possibility for producing a level closing profile during the transition is to cover the ducted fan, in particular in horizontal flight, by louvers at the inlet and outlet.

A further advantage of this solution, in addition to the improved performance, is an appealing look of the aircraft, as this does not allow a view of the open rotors during cruising.

On the suction side of the ducted fan, it is particularly important to ensure an optimized air flow while providing the ability to open and close the integrated louvers with a suitable kinematic system.

One embodiment of the invention therefore discloses the possibility of actuating the integrated inlet louvers while maintaining the base surface of the round flow passage of the ducted fan, which is essential for its flow guiding and deflecting function (into the flow passage). For this purpose, bars that can be aerodynamically optimized are used.

A further embodiment is further based on the finding that the wing profile in cruising generates a considerable negative pressure above the wing and a positive pressure below the wing. For the ducted fan according to the invention, it is therefore expedient to seal the upper wing surface against the lower wing surface in order to avoid pressure compensation during cruising.

Accordingly, the preference of a corresponding embodiment lies in the achieved sealing of the upper wing from the lower wing with minimal impairment of the outer sheathing in order to minimize any impairment of the performance of the wing-integrated ducted fan.

A further embodiment takes into account the fact that such a wing-integrated ducted fan should be equally suitable for the operating conditions of hovering, transitioning, and cruising. During the transition phase, it is important that the unit simultaneously generates lift and thrust. To this end, the air is deflected twice at an angle of approximately 90°: first by 90° into the channel passing through the wing in order to accelerate the flow with the embedded ducted fan, which can be assisted by the top-side flow guide louvers, and finally by 90° out of the wing channel in order to generate forward thrust.

The latter deflection can be favored by the outlet louvers through thrust vectorization. At the same time, the ducted fan in the wing benefits from the compression in the wing channel, which provides an additional overall boost to the aircraft according to the invention. The possible channel enlargement thus supports the total lift during hovering and transitioning.

A further embodiment is based on the finding that, during the acceleration in the transition operation, the flow (due to the increasing jet velocity around the aircraft) is not accelerated evenly along the feed lip into the channel. Thus, the flow initially separates at the bow-side edge of the ducted fan.

In light of this, the advantage of a corresponding embodiment lies in the improved compression in the ducted fan during the transition into cruising. Further, it reduces the proportion of turbulent air drawn in by the ducted fan during this transition. Finally, the flow separation is relocated in the rearward direction at the bow-side feed lip.

Further advantageous embodiments of the invention are specified in the dependent claims. For example, the aircraft can be equipped with bent or even optionally bendable wings. A corresponding variant enlarges the effective wing surface in horizontal flight, but without extending the standing surface of the aircraft.

Further, the aircraft can have a rapidly charging battery system that provides propulsion power for vertical take-off, landing, and horizontal flight, and allows for short-term charging of the aircraft while standing.

Finally, in addition to a preferably fully autonomous operation of the aircraft, with sufficient qualifications, the granting of a manual control to the human pilot is also considered, which lends the device according to the invention the greatest possible flexibility in handling.

BRIEF DESCRIPTION OF THE DRAWINGS

Exemplary embodiments of the invention are shown in the drawings and are described in further detail below.

FIG. 16 illustrates by way of example an operating concept having a rotary drive.

EMBODIMENTS OF THE INVENTION

Figure 1:
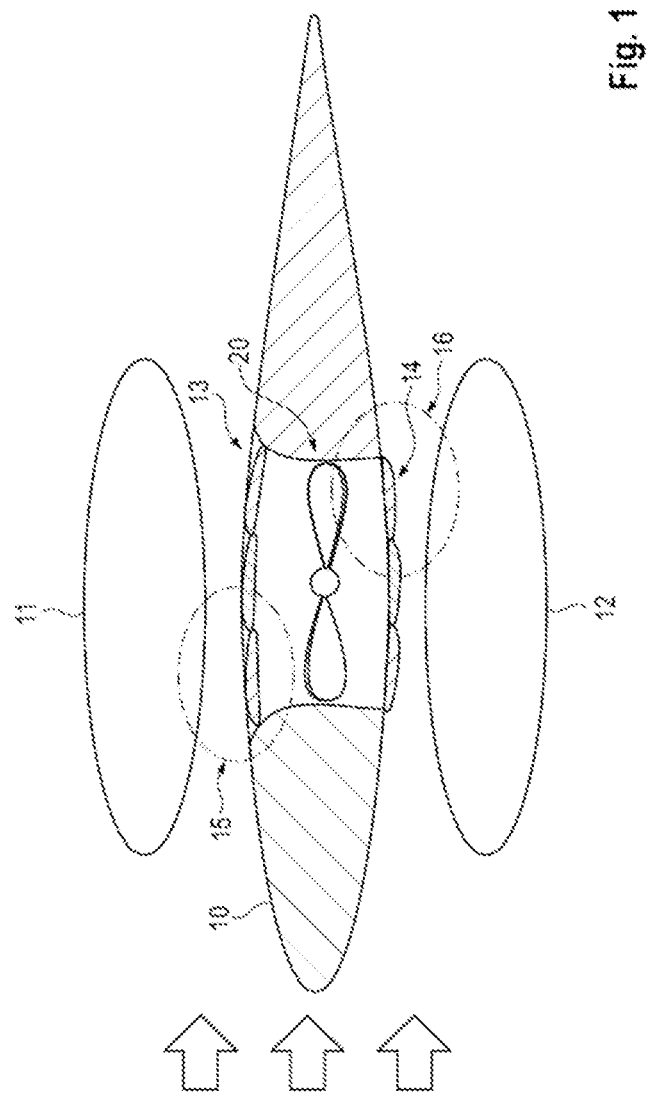
FIG. 1 shows the cross-section of a wing.

FIG. 1 shows the wing (10) of the aircraft in profile. As can be seen in the drawing, the wing (10) is vertically punctured by a ducted fan (20) having inlet louvers (13) on its top side according to the drawing and outlet louvers (14) on its bottom side for flow control. The outlet louvers (14) can be used in addition to the thrust vector control and thus in addition to the navigation of the aircraft and are also able to fully close the bottom of the ducted fan (20).

Figure 2:
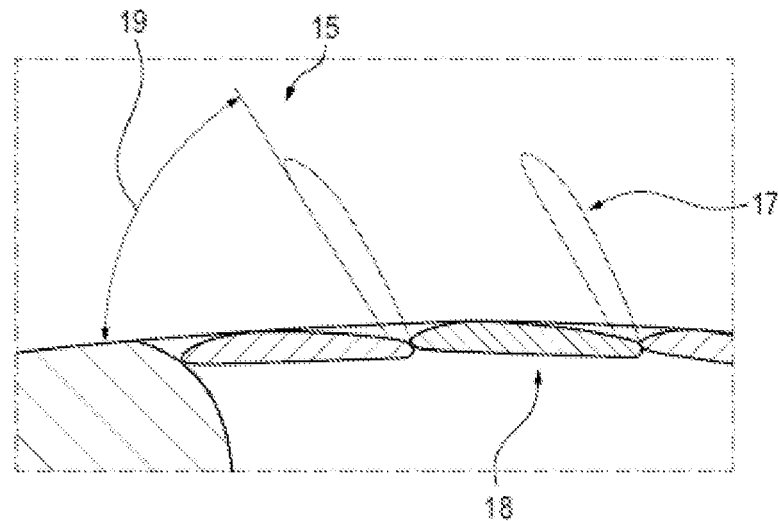
FIG. 2 shows a first detail 15 of the view according to FIG. 1.

As FIG. 2 illustrates, the inlet louvers (13) thus serve as flow guide blades, which, in their open position (17), direct the air flow into the ducted fan (20). (It is understood that, in particular on the inlet side, other closing mechanisms are possible without leaving the scope of the invention.)

Figure 3:
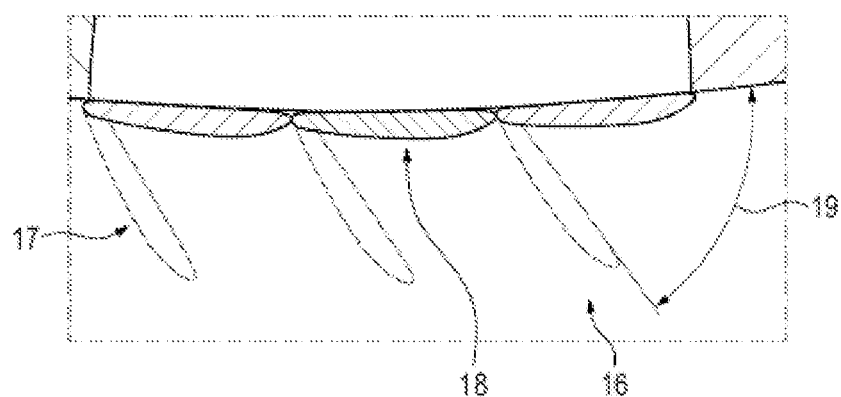
FIG. 3 shows a second detail 16 of the view according to FIG. 1.
Figure 4:
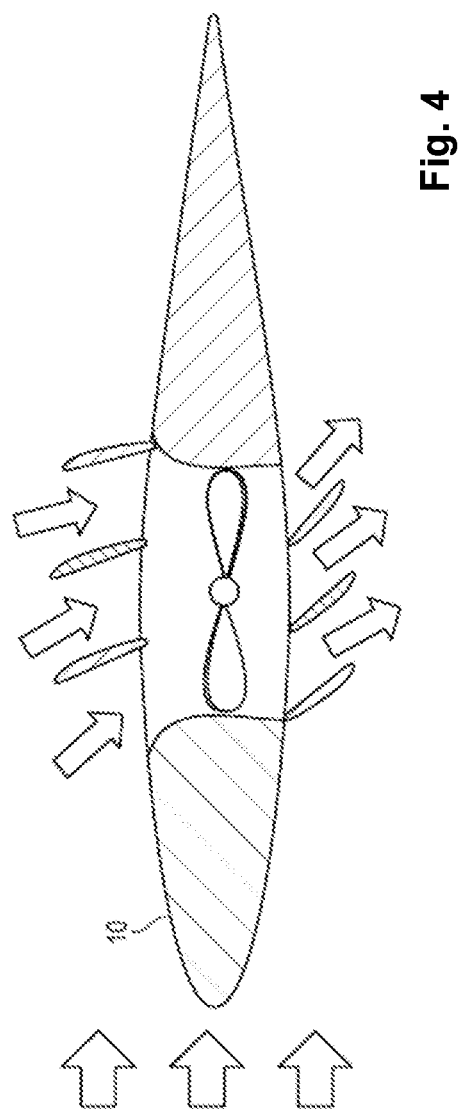
FIG. 4 shows hovering and transitioning.

The outlet louvers (14) which are better visible in FIG. 3 serve in a corresponding manner as thrust vector blades for controlling the aircraft and as flow guide blades in order to deflect the flow rearward and, when transitioning from the take-off phase to the cruising phase (cf. FIG. 4), to generate an increasing horizontal thrust.

Figure 5:
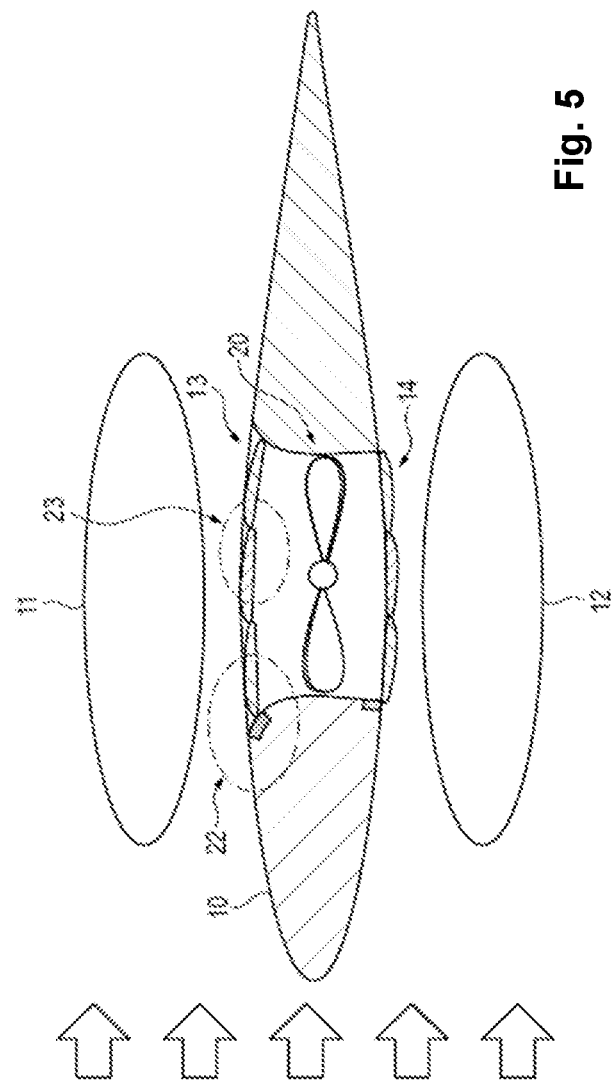
FIG. 5 shows the cross-section of the wing in a deviating view.

FIG. 5 shows an alternative view of the wing (10), which draws the viewer's attention to two details (22—FIG. 6, 23—FIG. 7), which are explained below.

Figure 6:
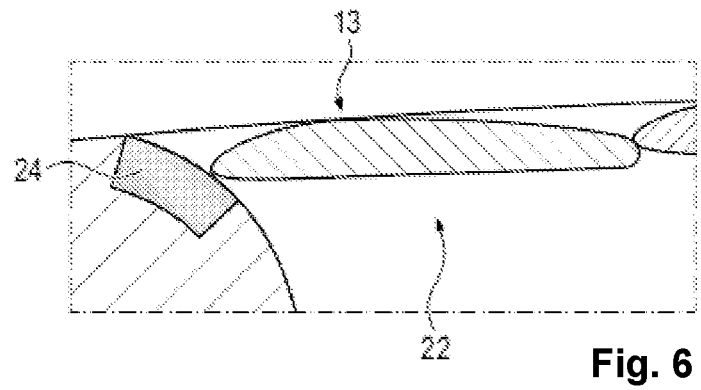
FIG. 6 shows a first detail 22 of the view according to FIG. 5.

FIG. 6 illustrates the seal between the inlet louvers (13) and the feed lip of the fan duct. For this purpose, it comprises a feed lip at least partially encompassing the ducted fan (20) having a flexible zone (24) in such a way that the closed inlet louvers (13) seal the wing (10) by pressing against this zone (24).

Figure 7:
FIG. 7 shows the cross-section of an inlet louver of the wing.
Figure 8:
FIG. 8 shows a second detail 23 of the view according to FIG. 5.

When combined, FIGS. 7 and 8 illustrate the seal between the front or inflowing edges and the rear or outflowing edges of the inlet louvers (13). Accordingly, the latter have a flexible zone (24) at their respective outflowing edge, such that the closed inlet louvers (13) seal the wing (10) by bending the outflowing edge below the inflowing edge of the respective downstream inlet louver (13).

Figure 9:
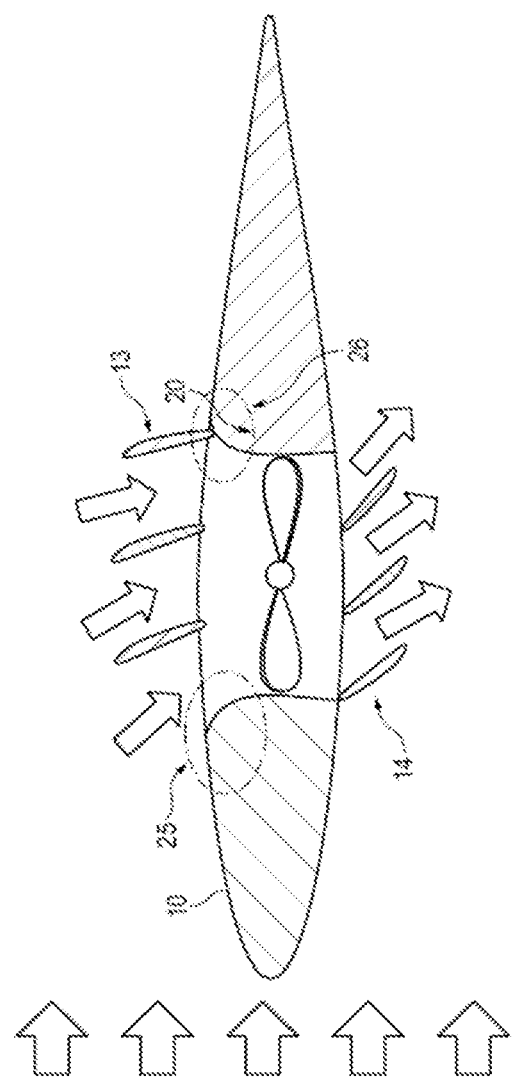
FIG. 9 shows the cross-section of a further wing, whose inlet and outlet louvers are in the open position.
Figure 10:
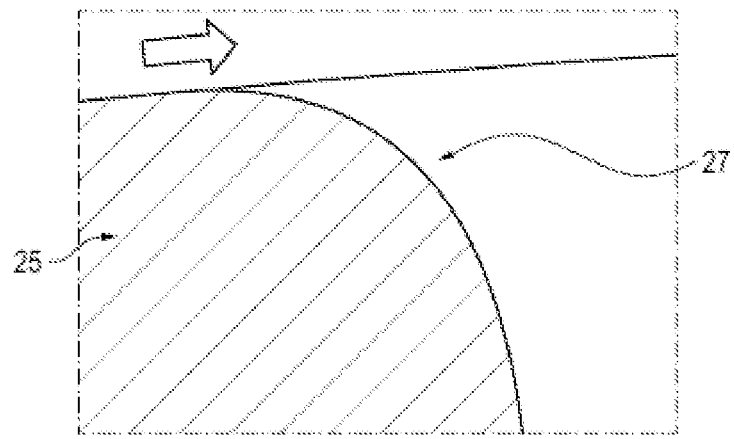
FIG. 10 shows a first detail 25 of the view according to FIG. 9.
Figure 11:
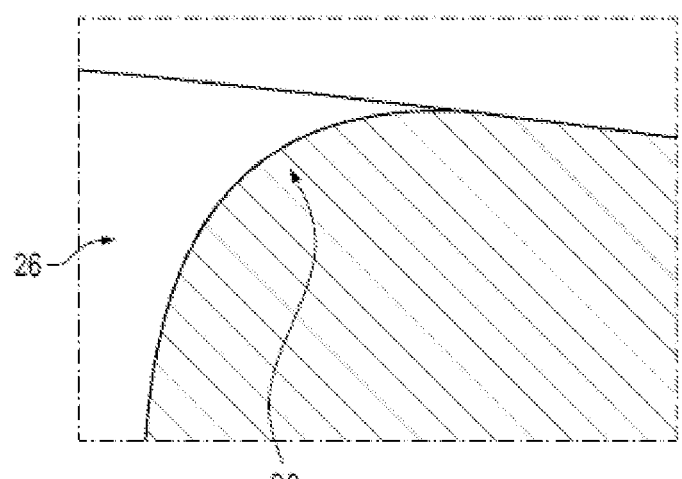
FIG. 11 shows a second detail 26 of the view according to FIG. 9.

FIG. 9 shows an embodiment of the wing (10), whose feed lip, which encompasses the ducted fan (20) on the top side, is aerodynamically optimized: As the detailed views of FIGS. 10 and 11 clearly show in comparison, the aforementioned feed lip has a flat curvature (27) on the bow side and a significantly stronger curvature (28) on the rear side.

Figure 12:
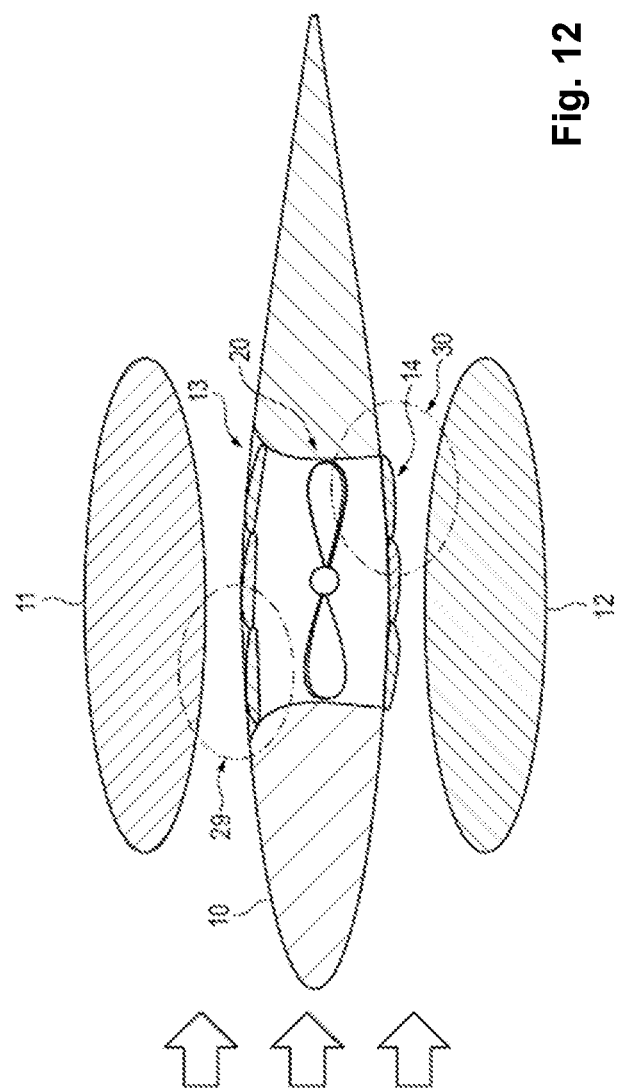
FIG. 12 shows the cross-section of the wing, wherein inlet and outlet louvers are in the closed position.

FIG. 12 shows the same wing (10), wherein the top side inlet louvers (13) and bottom side outlet louvers (14) are now in a fully closed position. In this way, a pressure balance between the negative pressure (11) prevailing above the wing (10) and the positive pressure (12) prevailing below the wing (10) through the ducted fan (20) is largely avoided in the cruising flight phase of the aircraft.

Figure 13:
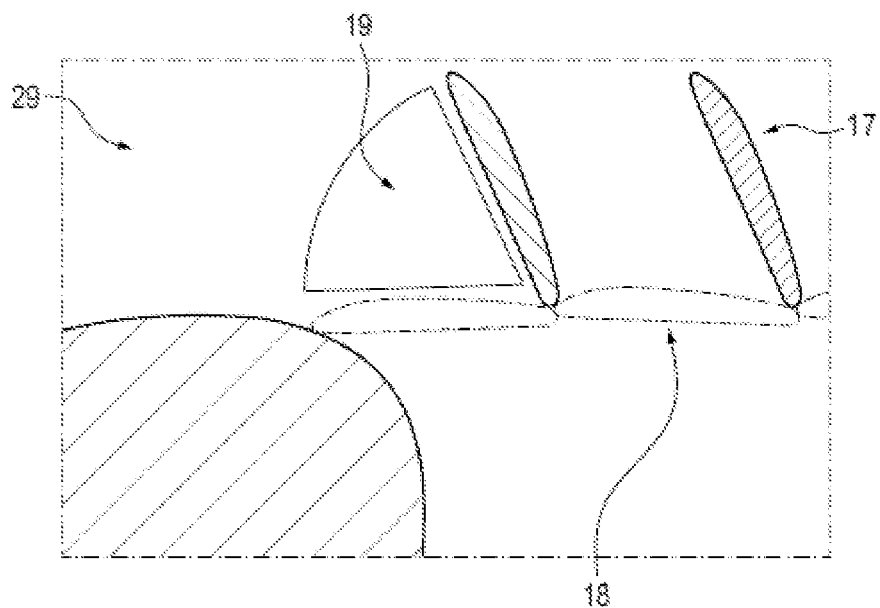
FIG. 13 shows a first detail 29 of the view according to FIG. 12.

As FIG. 13 illustrates, the inlet louvers (13) thus serve as flow guide blades that direct the air flow into the ducted fan (20) in their open position (17). (It is understood that, in particular on the inlet side, other closing mechanisms are possible without leaving the scope of the invention.)

Figure 14:
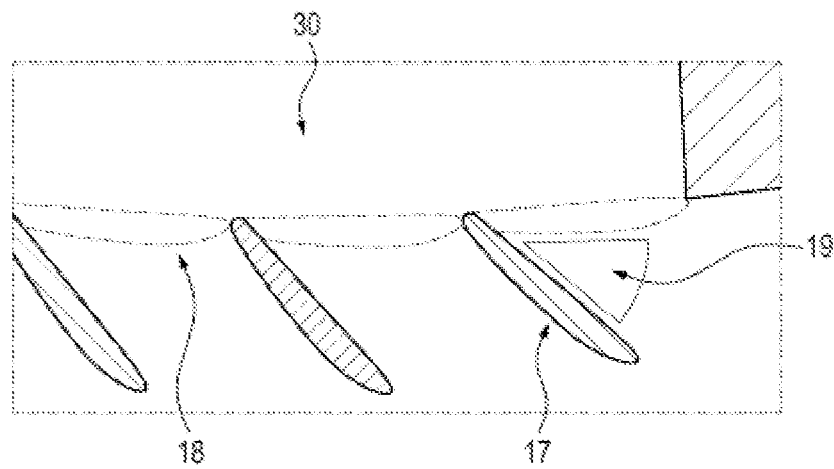
FIG. 14 shows a second detail 30 of the view according to FIG. 12.

The outlet louvers (14) that are more easily visible in FIG. 14 serve as thrust vector blades for controlling the aircraft and, in a corresponding manner, as flow guide blades to deflect the flow rearward and to generate an increasing horizontal thrust upon transition from the take-off phase to the cruising phase.

Figure 15:
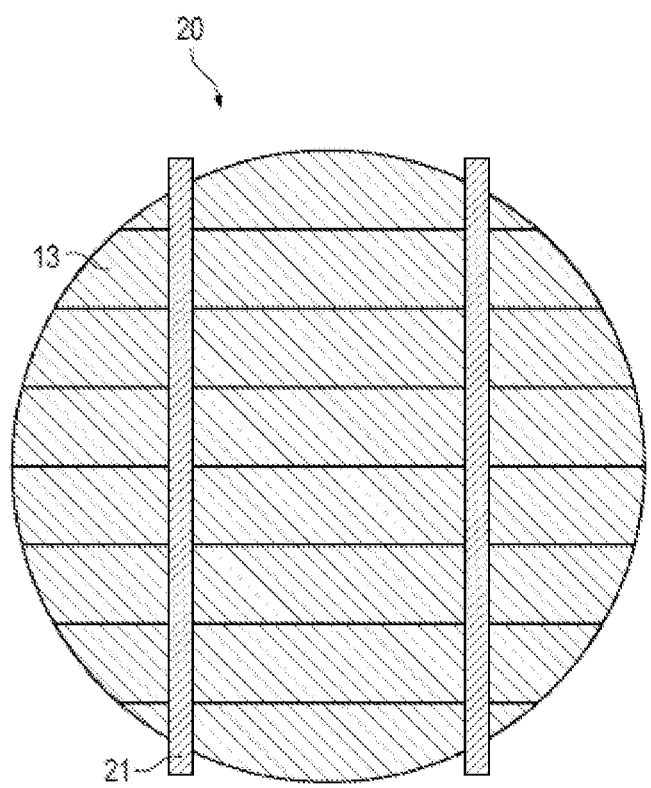
FIG. 15 shows a top plan view of the ducted fan of the wing.

In the present embodiment, two bars (21) spanning the ducted fan in parallel, whose configuration is illuminated in FIGS. 15 and 16, serve as the actuating mechanism of at least the inlet louvers (13). As the latter figure shows, these bars (21) are driven by a rotational actuator (33) offset by 90°, which is arranged outside of the wing passage between the bars (31). In the present embodiment, two planetary gears (35) serve to translate and engage a continuous shaft of the rotational actuator (33) on both sides.

Each bar (21) is associated with a radial lever (34), which translates the rotational movement translated by the transmission (35) into a translational movement that drives a pushrod (32), in the present case via an intermediate piece. This in turn supports a plurality of louver levers (31), each of which is associated with one of the louvers (13).

Both levers (34) are preferably in a self-inhibiting position in the closed state of the louvers (13) in order to not apply any forces to the rotational actuator (33) in turn.

The invention claimed is:

1. An aircraft comprising:
    a wing having an integrated ducted fan,
    inlet louvers and outlet louvers associated with the ducted fan,
    wherein the inlet louvers and the outlet louvers are adjustable between an open position and a closed position,
    wherein each inlet louver includes a leading edge and a trailing edge that is positionable against an adjacent inlet louver, wherein the trailing edge is more flexible than the leading edge.

2. The aircraft according to claim 1,
    wherein the inlet louvers and the outlet louvers are adjustable at an opening angle of greater than 90°.

3. The aircraft according to claim 1,
    wherein the ducted fan comprises a rotor and a stator arranged downstream of the rotor.

4. The aircraft according to claim 1,
    wherein the aircraft comprises an all-electric drive.

5. The aircraft according to claim 1,
    wherein the aircraft further comprises a rapidly chargeable battery system.

6. The aircraft according to claim 1,
wherein the ducted fan is substantially horizontal.

7. The aircraft according to claim 1,
wherein the aircraft further comprises substantially vertical fans for generating a propulsion.

8. The aircraft according to claim 7,
wherein the vertical fans are additional ducted fans.

9. The aircraft according to claim 1,
wherein the louvers are configured so as to avoid a pressure compensation between a negative pressure prevailing above the wing and a positive pressure prevailing below the wing through the ducted fan in a cruising phase of the aircraft.

10. The aircraft according to claim 1,
wherein the aircraft is fully autonomously controllable.

11. The aircraft according to claim 1, wherein the leading edge of one of the inlet louvers is positionable against a flexible portion formed on the wing, wherein the flexible portion of the wing has a greater flexibility than other portions of the wing.

12. The aircraft according to claim 11, wherein the wing includes an opening in which the integrated ducted fan is positioned, wherein the opening extends between top and bottom sides of the wing, wherein the flexible portion is defined on the wing at an entrance of the opening at the top side of the wing.

13. The aircraft according to claim 11, wherein the flexible portion does not extend to the bottom side of the wing.

14. The aircraft according to claim 11, wherein the flexible portion is positioned at a leading edge of the opening that is positioned closest to a leading edge of the wing, and the flexible portion is not positioned at a trailing edge of the opening that is positioned closest to a trailing edge of the wing.

15. The aircraft according to claim 1, wherein, for each inlet louver, the leading edge has a rounded geometry and the trailing edge has a pointed geometry.

16. The aircraft according to claim 1, wherein for each inlet louver, the trailing edge is deformable upon contacting said adjacent inlet louver.

17. The aircraft according to claim 1, wherein the inlet louvers are each connected to a translatable bar.

18. The aircraft according to claim 17, further comprising a rotational actuator connected to the translatable bar, wherein rotation of the rotational actuator causes translation of the translatable bar, which causes simultaneous movement of the inlet louvers between the open and closed positions.

19. The aircraft according to claim 18, further comprising a radial lever that interconnects the translatable bar with the rotational actuator.

* * * * *